United States Patent
Xie et al.

(10) Patent No.: US 7,260,261 B2
(45) Date of Patent: Aug. 21, 2007

(54) SYSTEMS AND METHODS FOR ENHANCED IMAGE ADAPTATION

(75) Inventors: Xing Xie, Beijing (CN); Wei-Ying Ma, Beijing (CN); Hong-Jiang Zhang, Beijing (CN); Liqun Chen, Jiangxi (CN); Xin Fan, Hefei (CN)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 10/371,125

(22) Filed: Feb. 20, 2003

(65) Prior Publication Data

US 2004/0165784 A1 Aug. 26, 2004

(51) Int. Cl.
*G06K 9/34* (2006.01)
(52) U.S. Cl. ...................... 382/173; 382/298
(58) Field of Classification Search ................ 382/180, 382/195, 239, 173, 229
See application file for complete search history.

(56) References Cited

U.S. PATENT DOCUMENTS

| | | |
|---|---|---|
| 5,442,633 A | 8/1995 | Perkins et al. |
| 5,497,430 A | 3/1996 | Sadovnik et al. |
| 5,530,963 A | 6/1996 | Moore et al. |
| 5,625,877 A | 4/1997 | Dunn et al. |
| 5,642,294 A | 6/1997 | Taniguchi et al. |
| 5,659,685 A | 8/1997 | Williams et al. |
| 5,745,190 A | 4/1998 | Ioka |
| 5,751,378 A | 5/1998 | Chen et al. |
| 5,774,593 A | 6/1998 | Zick et al. |
| 5,778,137 A | 7/1998 | Nielsen et al. |
| 5,801,765 A | 9/1998 | Gotoh et al. |
| 5,835,163 A | 11/1998 | Liou et al. |
| 5,884,056 A | 3/1999 | Steele |

(Continued)

FOREIGN PATENT DOCUMENTS

EP 0597450 5/1994

(Continued)

OTHER PUBLICATIONS

Goncalves, Towards a Learning Model for Feature Integration in Attention Control, Aug. 20-22, 2001, International Conference on Multisensor Fusion and Integration for Intelligent Systems, pp. 311-316.*

(Continued)

*Primary Examiner*—Matthew C. Bella
*Assistant Examiner*—Dennis Rosario
(74) *Attorney, Agent, or Firm*—Lee & Hayes, PLLC

(57) ABSTRACT

Systems and methods for adapting images for substantially optimal presentation by heterogeneous client display sizes are described. In one aspect, an image is modeled with respect to multiple visual attentions to generate respective attention objects for each of the visual attentions. For each of one or more image adaptation schemes, an objective measure of information fidelity (IF) is determined for a region R of the image. The objective measures are determined as a function of a resource constraint of the display device and as a function of a weighted sum of IF of each attention object in the region R. A substantially optimal adaptation scheme is then selected as a function of the calculated objective measures. The image is then adapted via the selected substantially optimal adaptation scheme to generate an adapted image as a function of at least the target area of the client display.

49 Claims, 6 Drawing Sheets

U.S. PATENT DOCUMENTS

| | | | |
|---|---|---|---|
| 5,900,919 | A | 5/1999 | Chen et al. |
| 5,911,008 | A | 6/1999 | Niikura et al. |
| 5,920,360 | A | 7/1999 | Coleman, Jr. |
| 5,959,697 | A | 9/1999 | Coleman, Jr. |
| 5,983,273 | A | 11/1999 | White et al. |
| 5,990,980 | A | 11/1999 | Golin |
| 5,995,095 | A | 11/1999 | Ratakonda |
| 6,047,085 | A | 4/2000 | Sato et al. |
| 6,100,941 | A | 8/2000 | Dimitrova et al. |
| 6,166,735 | A | 12/2000 | Dom et al. |
| 6,232,974 | B1 | 5/2001 | Horvitz et al. |
| 6,282,317 | B1 | 8/2001 | Luo et al. |
| 6,292,589 | B1 * | 9/2001 | Chow et al. ............... 382/239 |
| 6,408,128 | B1 | 6/2002 | Abecassis |
| 6,462,754 | B1 | 10/2002 | Chakraborty et al. |
| 6,466,702 | B1 | 10/2002 | Atkins et al. |
| 6,473,778 | B1 | 10/2002 | Gibbon |
| 6,622,134 | B1 * | 9/2003 | Sorkin ....................... 706/20 |
| 6,643,665 | B2 | 11/2003 | Kimbell et al. |
| 6,670,963 | B2 * | 12/2003 | Osberger ................... 345/629 |
| 6,714,909 | B1 | 3/2004 | Gibbon et al. |
| 6,792,144 | B1 | 9/2004 | Yan et al. |
| 2002/0157116 | A1 | 10/2002 | Jasinschi |
| 2002/0166123 | A1 | 11/2002 | Schrader et al. |
| 2003/0033347 | A1 | 2/2003 | Bolle et al. |
| 2003/0123850 | A1 | 7/2003 | Jun et al. |
| 2003/0152363 | A1 | 8/2003 | Jeannin et al. |
| 2003/0210886 | A1 | 11/2003 | Li et al. |
| 2003/0237053 | A1 | 12/2003 | Chen et al. |
| 2004/0040041 | A1 | 2/2004 | Crawford |
| 2004/0068481 | A1 | 4/2004 | Seshadri et al. |
| 2004/0078357 | A1 | 4/2004 | LaChapelle et al. |
| 2004/0078382 | A1 | 4/2004 | Mercer et al. |
| 2004/0078383 | A1 | 4/2004 | Mercer et al. |
| 2006/0239644 | A1 | 10/2006 | Barbieri |

FOREIGN PATENT DOCUMENTS

| | | |
|---|---|---|
| EP | 1 168 840 | 1/2002 |
| EP | 1 213 915 | 6/2002 |
| GB | 2 356 080 | 5/2001 |
| JP | 5-113439 | 5/1993 |

OTHER PUBLICATIONS

Osberger et al., An Automatic Image Quality Assessment Technique Incorporating Higher Level Perceptual Factors, Oct. 4-7, 1998, International Conference on Image Processing,vol. 3, pp. 414-418.*
Alexander, et al., "Informedia: News-on-Demand Multimedia Information Acquisition and Retrieval", 1997, pp. 1-21.
Chen, et al., "A Visual Attention Model for Adapting Images on Small Displays", Microsoft Technical Report MSR-TR-2002-125, Nov. 4, 2002, 22 pages.
DeMenthon, et al., "Video Summarization by Curve Simplification", ACM, 1998, pp. 211-218.
Gong, et al., "Creating Motion Video Summaries with Partial Audio-Visual Alignment", IEEE, 2002, pp. 285-288.
"Advanced Digital Video Storage and On-line Retrieval System", Advisor Project, Jun. 30, 2002, retrieved from the Internet: http://advisor.matrasi-tis.fr/DUP_workshop_sheet.pdf.
Zhang, et al., "A Hierarchical Organization Scheme for Video Data" Pattern Recognition, Elsevier, Kidlington, GB, vol. 36 No. 11, Nov. 2002, pp. 2381-2387.
Hargrove, et al., "Logo Detection in Digital Video" Math 100 Mar. 6, 2001 http://toonarchive.com/logo-detection/ 9 pages.
Wolfe, et al., "Deplying Visual Attention: The Guided Search Model" AI and the Eye chapter 4 1990 pp. 79-103.
Fan, et al., "Visual Attention Based Image Browsing on Mobile Devices" 4 pages.
Ahmad, Subutai; "VISIT: A Neural Model of Covert Visual Attention" Advances in Neural Information Processing Systems, v. 4, 1991, pp. 420-427.
Baluja et al.; "Expectation-Based Selective Attention for Visual Monitoring and Control of a Robot Vehicle" Robotics and Autonomous Systems, v. 22, No. 3-4, Dec. 1997, pp. 329-344.
Cherry, Steven M.; "Pesky Home Networks Trouble cable Behemoths" IEEE Spectrum, Apr. 2002, pp. 60-61.
Deng, et al.;"Peer Group Filtering and Perceptual Color Image Quantization" Proceedings of IEEE International Symposium on Circuits and Systems, vol. 4, 1999, pp. 21-24.
Gamaz et al.; "Robust scene-change detection in MPEG compressed domain" Electrical & Computer Engineering, 1998, pp. 95-99.
Gu, et al.; "Dissolve Detection in MPEG Compressed Video" IEEE, 1997, pp. 1692-1696.
Held, Gibert; "Focus on Agere System's Orinococ PC Card" International Journal of Network Management, Jan. 2002, pp. 187-193.
http://www.fatalfx.com/nomad/ "NOMAD (No More Advertising)" Feb. 17, 2003, 4 pages.
Divakaran et al.; "Video Summarization Using Descriptors of Motion Activity: A Motion Activity Based Approach to Key-Frame Extraction from Video Shots" Journal of Electronic Imaging, Oct. 2001, vol. 10 No. 4, pp. 909-916.
Heng et al.; "Post Shot Boundary Detection Technique: Flashlight Scene Determination" University of Western Australia, 1999, pp. 447-450.
Jha, Uma S.; "Wireless Landscape-Need for Seamless Connectivity" Wireless Personal Communications 2002 pp. 275-283.
Jing et al.; "An Effective Region-Based image Retieval Framework" From ACM Multimedia, 2002, 28 pages.
Lelescu et al.; "Real-time Scene Change Detection on Compressed Multimedia Bitstream Based on Statistical Sequential Analysis" IEEE, 2000, pp. 1141-1144.
Li et al.; "Statistical Learning of Multi-View Face Detection" Proceedings of ECCV, 2002, 25 pages.
Lienhart, R. et al.; "On the Detection and Recognition of Television Commercials" University of Mannheim, 17 pages.
Lu, Lie et al.; "A Robust Audio Classification and Segmentation Method" Microsoft Research, China, 9 pages.
Lu, Lie et al.; "Content Analysis for Audio Classification and Segmentation" IEEE Transactions on Speech and Audio Processing, vol. 10 No. 7, Oct. 2002, pp. 504-516.
Lu, Lie et al.; "Content-Based Audio Segmentation Using Support Vector Machines" IEEE, 2001, pp. 956-959.
Ma et al.; "A User Attention Model for Video Summarization" Proceedings of ICIP, 2002.
Milanese R. et al.; "Attentive Mechanisms for Dynamic and Static Scene Analysis" Optical Engineering, v34 No. 8, Aug. 1995, pp. 2428-2434.
Niebur, E. et al.; "Computational Architectures for Attention" The Attentive Brain, Chapter 9, 1998, pp. 163-186.
O'Toole; "An MPEG-1 Shot Boundary Detector Using XIL Colour Histograms" Dublin City University, 1998, pp. 1-7.
Sadlier, David A.; "Automatic TV Advertisement Detection from MPEG Bitstream" Centre for Digital Video Processing/Research Institute for Network & Communication Eng., Dublin City University, 12 pages.
Sahoo P.K. et al.; "Threshold Selection Using a Minimal Histogram Entropy Difference" Optical Engineering, v36 No. 7, Jul. 1997, pp. 1976-1981.
Sanchez, Juan Maria; "AudiCom: A Video Analysis System for Auditing Commercial Broadcasts" Computer Vision Center Departament d'Informatica Universitat Autonoma de Barcelona, 5 pages.
Tsotsos J. K. et al.; "Modeling Visual Attention Via Selective Tuning" Artificial Intelligence v78 1995 pp. 507-545.
Yeo et al.; "Rapid Scene Analysis on Compressed Video" IEEE, 1995, pp. 533-544.
Yusoff et al.; "Video Shot Cut Detection Using Adaptive Thresholding" University of Surrey, 2000, pp. 1-10.
Zabih, Ramin; "A Feature-Based Algorithm for Detection and Classifying Scene Breaks" Computer Science Department, Cornell University, 16 pages.

Zadeh L. A.; "Probability Measures of Fuzzy Events" Journal of Mathematical Analysis and Applications, 23, 1968, pp. 421-427.

M.A. Smith & T. Kinkade, "Video Skimming and Characterization through the Combination of Image and Language Understanding Techniques," Proc. of Computer Vision and Pattern Recognition, 1997 IEEE, pp. 775-781.

L. Itti & C. Koch, "Computational Modelling of Visual Attention," Nature Reviews/Neuroscience, vol. 2, Mar. 2001, pp. 1-11.

L. Itti, C. Koch & E. Niebur, "A Model of Saliency-based Visual Attention for Rapid Scene Analysis," IEEE Trans. on Pattern Analysis and Machine Intelligence, 1998, 5 pages.

L. Itti & C. Koch, "A Comparison of Feature Combination Strategies for Saliency-Based Visual Attention Systems," Proc. of SPIE Human Vision and Electronic Imaging IV (HVEI'99), San Jose, CA, vol. 3644, pp. 473-482, Jan. 1999.

Yu-Fei Ma & Hong-Jiang Zhang, "A New Perceived Motion Based Shot Content Representation," Microsoft Research China, 4 pages.

Yu-Fei Ma & Hong-Jiang Zhang, "A Model of Motion Attention for Video Skimming," Microsoft Research Asia, 4 pages.

Colin O'Toole et al., "Evaluation of Automatic Shot Boundary Detection on a Large Video Test Suite," School of Computer Applications & School of Electronic Engineering, Dublin City University, Glasnevin, Dublin, Ireland, Challenge of Image Retrieval, Newcastle, 1999, pp. 1-12.

T. Lin, H.J. Zhang, Q.Y. Shi, "Video Scene Extraction by Force Competition," IEEE Intl. Conference on Multimedia and Expo (ICME 001), Waseda University, Tokyo, Japan, Aug. 22-25, 2001, 4 pages.

U.S. Appl. No. 10/179,161, filed Jun. 24, 2002, Inventors Jin-Lin chen & Wei-Ying Ma, entitled "Function-based Object Model for Web Page Display in a Mobile Device,".

U.S. Appl. No. 10/286,348, filed Nov. 1, 2002, inventors Xian-Sheng Hua et al., entitled "Systems and Methods for Automatically Editing a Video,".

U.S. Appl. No. 10/286,053, filed Nov. 1, 2002, inventors Yu-Fei Ma et al., entitled "Systems and Methods for Generating a Comprehensive User Attention Model,".

U.S. Appl. No. 10/285,933, filed Nov. 1, 2002, inventors Yu-Fei Ma et al., "Systems and Methods for Generating a Motion Attention Model,".

Lee, Keansub et al., "Perception-Based Image Transcoding for Universal Multimedia Access," School of Electrical Engineering Korea University, Seoul, Korea, 2001 IEEE, pp. 475-478.

Christopoulos, Charilaos et al., "The JPEG2000 Still Image Coding System: An Overview," IEEE Transactions on Consumer Electronics, vol. 46, No. 4, pp. 1103-1127, Nov. 2000.

Chen, Jinlin et al., "Function-based Object Model Towards Website Adaptation," (2001) Proc. of the 10th Int. WWW Conf. pp. 1-21.

The Journal of Food Hygienic Society of Japan, vol. 39, No. 5, pp. 333-340 (1998).

Abstract Book for HPLC Kyoto (preprints in a meeting, Sep. 2001), pp. 135-136.

* cited by examiner

SYSTEMS AND METHODS FOR ENHANCED IMAGE ADAPTATION

RELATED APPLICATIONS

This patent application is related to:

U.S. patent application Ser. No. 10/286,053, titled "Systems and Methods for Generating a Comprehensive User Attention Model", filed on Nov. 1, 2002, commonly assigned herewith, and hereby incorporated by reference; and, U.S. patent application Ser. No. 10/285,933, titled "Systems and Methods for Generating a Motion Attention Model", filed on Nov. 1, 2002, commonly assigned herewith, and hereby incorporated by reference.

TECHNICAL FIELD

The invention pertains to image processing.

BACKGROUND

Advances in hardware and software have resulted in numerous new types of mobile Internet client devices such as hand-held computers, personal digital assistants (PDAs), telephones, etc. As a trade-off for compact design and mobility, such client devices (hereinafter often referred to as "small-form-factor" devices) are generally manufactured to operate in resource constrained environments. A resource constrained environment is a hardware platform that provides substantially limited processing, memory, and/or display capabilities as compared, for example, to a desktop computing system. As a result, the types of devices across which Internet content may be accessed and displayed typically have diverse computing and content presentation capabilities as compared to one another.

Internet content authors and providers generally agree that serving a client base having disparate computing and content presentation capabilities over networks having different data throughput characteristics presents a substantial challenge. Conventional image adaptation techniques attempt to meet this challenge by reducing the size of high-resolution Internet content via resolution and content reduction as well as data compression techniques. Unfortunately, even though employing such conventional image adaptation techniques may speed-up content delivery to the client over a low-bandwidth connection, excessively reduced and compressed content often provide Internet client device users with a viewing experience that is not consistent with human perception. Such a viewing experience is also often contrary to the high-quality impression that content authors/providers prefer for the viewer to experience, and contrary to the universal access to high quality images viewers generally desire.

To make matters worse, algorithms used in conventional image adaptation schemes often involve large number of adaptation rules or over-intensive computations (e.g., semantic analysis) that are impracticable for systems that provide on-the-fly adaptive content delivery for mobile small-form-factor devices.

The following arrangements and procedures address these and other problems of conventional techniques to adapt content for delivery and presentation by Internet client devices.

SUMMARY

Systems and methods for adapting images for substantially optimal presentation by heterogeneous client display sizes are described. In one aspect, an image is modeled with respect to multiple visual attentions to generate respective attention objects for each of the visual attentions. For each of one or more image adaptation schemes, an objective measure of information fidelity (IF) is determined for a region R of the image. The objective measures are determined as a function of a resource constraint of the display device and as a function of a weighted sum of IF of each attention object in the region R. A substantially optimal adaptation scheme is then selected as a function of the calculated objective measures. The image is then adapted via the selected substantially optimal adaptation scheme to generate an adapted image as a function of at least the target area of the client display.

BRIEF DESCRIPTION OF THE DRAWINGS

The following detailed description is described with reference to the accompanying figures. In the figures, the left-most digit of a component reference number identifies the particular figure in which the component first appears.

DETAILED DESCRIPTION

Overview

Figure 1:
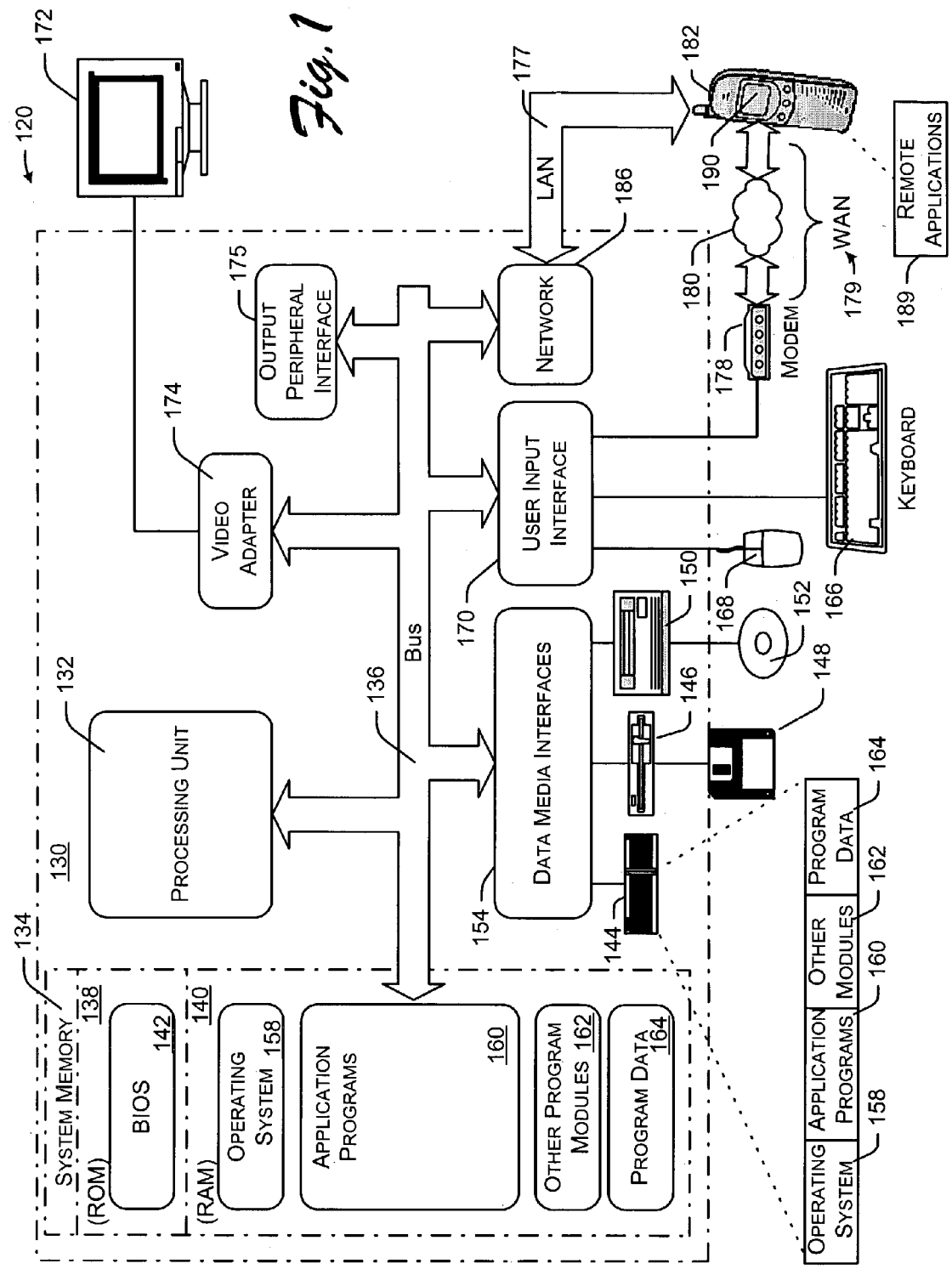
FIG. 1 is a block diagram of an exemplary computing environment within which systems and methods for enhanced image adaptation may be implemented.

The following described arrangements and procedures provide a framework to adapt a static image in view of a resource constrained client such as a small-form-factor client for display. To this end, the framework analyzes the image in view of multiple computational visual attention models. As a basic concept, "attention" is a neurobiological concentration of mental powers upon an object; a close or careful observing or listening, which is the ability or power to concentrate mentally. The multiple visual attention models used in this framework are computational to dynamically reduce attention into a series of localized algorithms. Results from visual attention modeling of the image are integrated to identify one or more portions, or "attention objects" (AOs) of the image that are most likely to be of interest to a viewer. A substantially optimal adaptation scheme is then selected for adapting the identified AOs. The scheme is selected as a function of objective measures indicating that the scheme will result in highest image fidelity of the AOs after adaptation in view of client resource constraints such as target screen size. The identified image portions are then adapted via the selected adaptation scheme for considerably optimal viewing at the client.

An Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 120 on which the subsequently described systems, apparatuses and methods for enhanced image adaptation may be implemented. Exemplary computing environment 120 is only one example of a suitable computing environment and is not intended to suggest any limitation as to the scope of use or functionality of systems and methods the described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Examples of well known computing systems, environments, and/or configurations that may be suitable include, but are not limited to, including hand-held devices, multi-processor systems, microprocessor based or programmable consumer electronics, network PCs, minicomputers, mainframe computers, portable, communication devices, and the like. The invention may also be practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include some or all of the elements and features described herein relative to computer 130. Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
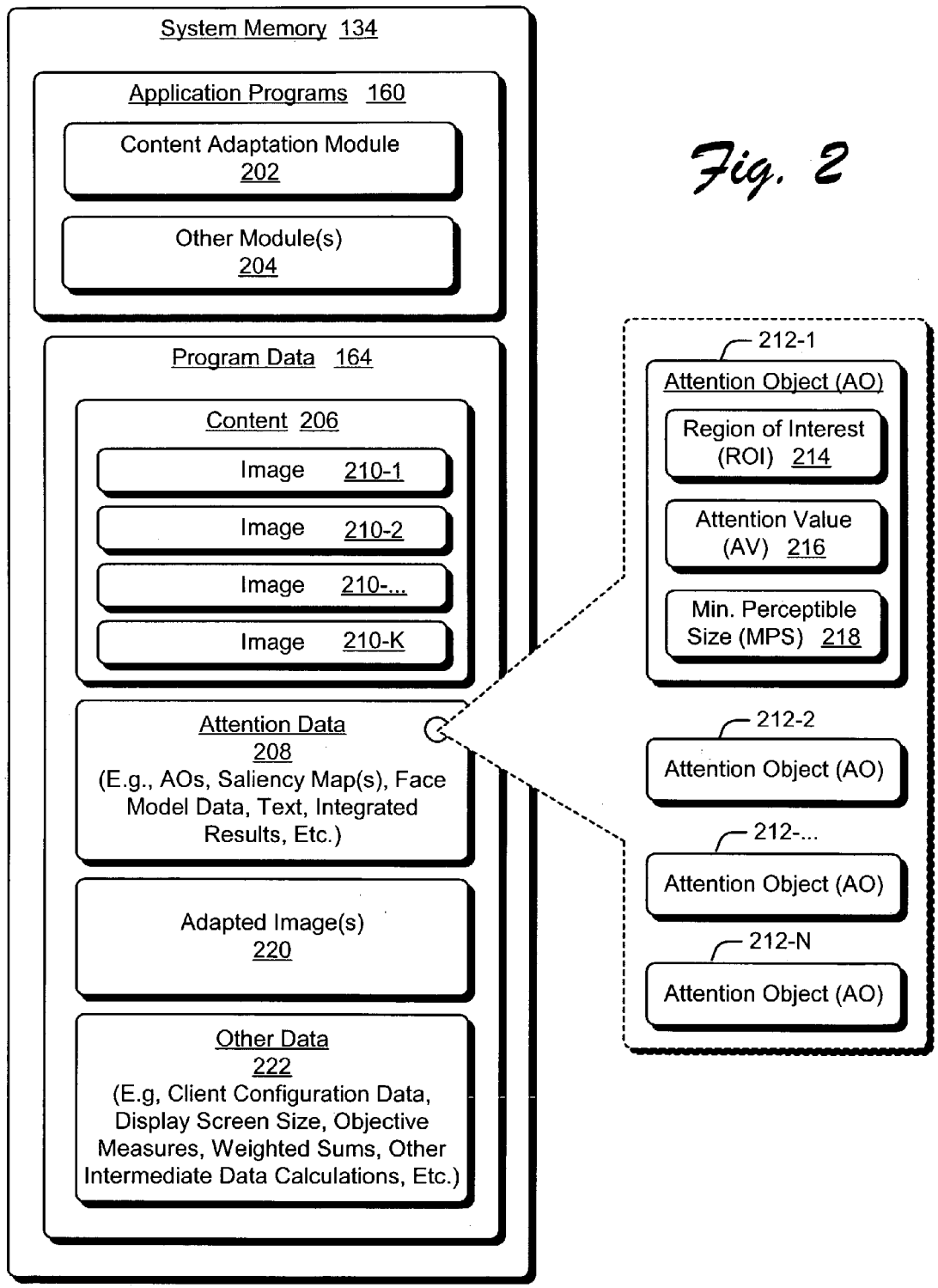
FIG. 2 shows further exemplary aspects of application programs and program data of FIG. 1 used for enhanced image adaptation.

FIG. 2 shows further exemplary aspects of application programs and program data of FIG. 1 for enhanced image adaptation. In particular, system memory 134 is shown to include application programs 160 and program data 164. Application programs include, for example, content adaptation module 202 and other modules 204 such as an operating system to provide a run-time environment, and so on. The content adaptation module analyzes content 206 (e.g., a Web page designed in a markup language such as the Hypertext Markup Language (HTML)) in view of multiple visual attention models (e.g., saliency, face, text, etc.) to generate attention data 208 for each image 210-1 through 210-K of the content. The attention data includes, for example, a set of attention objects (AOs) 212-1 through 212-N for each attention modeling scheme utilized for each image. For instance, saliency attention modeling results in a first set of AOs for each image. Face attention modeling results in a second set of AOs for each image, and so on.

As a result of the visual attention modeling of the images 210-1 through 210-K, most perceptible information of an image will be located inside the AOs 212-1 through 212-N. Because of this, each AO is an information carrier that has been computationally determined to deliver at least one intention of the content author. For instance, an AO may represent a semantic object, such as a human face, a flower, a mobile car, text, and/or the like, that will catch part of the viewer's attention, as a whole. In light of this, the combination of information in the AOs generated from an image will catch most attentions of a viewer.

Each AO 212 (each one of the AOs 212-1 though 212-N) is associated with three (3) respective attributes: a Region-Of-Interest (ROI) 214, an Attention Value (AV) 216 and a Minimal Perceptible Size (MPS) 218. The ROI is a spatial region or segment within an image that is occupied by the particular AO. An ROI can be of any shape and ROIs of different AOs may overlap. In one implementation, a ROI is represented by a set of pixels in the original image. In another implementation, regular shaped ROIs are denoted by their geometrical parameters, rather than with pixel sets. For example, a rectangular ROI can be defined as {Left, Top, Right, Bottom} coordinates, or {Left, Top, Width, Height} coordinates, while a circular ROI can be defined as {Center_x, Center_y, Radius}, and so on.

Different AOs 212-1 through 212-N represent different portions and amounts of an image's 210-1 through 210-K information. In light of this, the content adaptation module 202 assigns each AO in the image a respective quantified attention value (AV). Thus, an AO's AV indicates the relative weight of the AO's contribution to the information contained in the image as compared to the weights of other AOs.

The total amount of information that is available from an AO 212 is a function of the area it occupies on an image 210-1 through 210-K. Thus, overly reducing the resolution of the AO may not include the content or message that the image's author originally intended for a viewer to discern. In light of this, a Minimal Perceptible Size (MPS) 218 is assigned to each AO to indicate a minimal allowable spatial area for the AO. The content adaptation module 202 uses the MPS is used as a reduction quality threshold to determine whether an AO should be further sub-sampled or cropped during image adaptation operations.

For example, suppose an image 210 contains N number of AOs 212, $\{AO_i\}$, i=1, 2 ..., N, where $AO_i$ denotes the $i^{-th}$ AO within the image. The MPS 218 of $AO_i$ indicates the minimal perceptible size of $AO_i$, which can be presented by the area of a scaled-down region. For instance, consider that a particular AO represents a human face whose original resolution is 75×90 pixels. The author or publisher may define its MPS to be 25×30 pixels which is the smallest resolution to show the face region without severely degrading its perceptibility. The MPS assignment may be accomplished manually by user interaction, or calculated automatically in view of a set of rules. In this manner, the content adaptation module provides end-users with an adapted image that is not contrary to the impression that the content author/provider intended the end-user to experience.

In view of the foregoing, the content adaptation module 202 generates AOs for each an image 210-1 through 210-K as follows:

$$\{AO_i\}=\{(ROI_i, AV_i, MPS_i)\}, 1 \leq i \leq N \quad (1).$$

$AO_i$, represents the $i^{-th}$ AO within the image; $ROI_i$ represents the Region-Of-Interest 212 of $AO_i$; $AV_i$ represents the Attention Value 214 of $AO_i$; $MPS_i$ represents the Minimal Perceptible Size 216 of $AO_i$; and, N represents the total number of AOs in the image.

For each image 210-1 through 210-K, the content adaptation module 202 integrates and analyzes the attention data 208 generated from the visual attention modeling operations. Such analysis identifies a region R of the image that includes one or more AOs 212-1 through 212-N with substantially high attention values (AVs) as compared to other AOs of the image. (E.g., see region R 604 of FIG. 6). Thus, the identified region R is objectively determined to be most likely to attract human attention as compared to other portions of the image. The content adaptation module then identifies a substantially optimal image adaptation scheme (e.g., reduction, compression, and/or the like) to adapt the region R, and the image as a whole, in view of client resource constraints and such that the highest image fidelity (IF) over the region R is maintained. The analyzed images are then adapted (i.e., adapted image(s) 220) based on information from these AOs and in view of a target client display (e.g., screen 176 or 190 of FIG. 1) characteristics. Further details of these exemplary operations are now described.

Display Constraint-Based Presentation of High Attention Value Objects

The content adaptation module 202 manipulates AOs 212 for each image 210 to adapt the image 220 such that it represents as much information as possible under target client device resource constraints such as display screen size, display resolution, and/or the like. However, as described above, each AO is reduced in size as a function not only of display screen size, but also as a function of the AO's quality reduction threshold attribute, the MPS 218. Thus, although the MPS substantially guarantees a certain level of image quality, it is possible that enforcement of the MPS may result in an adapted image 220 that is too large to view at any one time on a display screen (e.g., see displays 172 and 190 of FIG. 1). In other words, such an adapted image may need to be scrolled horizontally and/or vertically for all portions of the adapted image to be presented on the client display.

In light of this, and to ensure a substantially valuable viewing experience, the content adaptation module 202 directs the client device to initially present a portions of the image that includes one or more AOs 212 that include respective AVs 214 to indicate that they are more likely to attract the user's attention than other portions of the image. To illustrate such image adaptation in view of client resource constraints, please refer to the examples of FIGS. 3-5, which in combination show exemplary differences between conventional image adaptation results (FIG. 3) and exemplary image adaptation results according to the arrangements and procedures of this invention (FIGS. 4 and 5).

Figure 3:
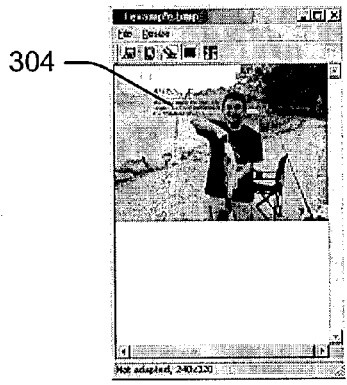
FIG. 3 shows exemplary results of a conventional image adaptation as displayed by a client device.
Figure 4:
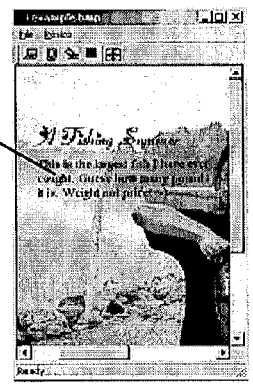
FIG. 4 shows an exemplary adapted image that was generated by attention-based modeling of an image adapting device of the invention.

FIG. 3 shows exemplary results 300 of conventional image adaptation as displayed by a client device 300. Note that the informative text 302 in the upper left quadrant of the adapted image is barely recognizable. This is due to the excessive resolution reduction that was performed to fit the image to a screen dimension of 240×320 pixels, which is the size of a typical pocket PC screen. In contrast to FIG. 3, FIG. 4 shows an exemplary adapted image 400 that was generated by the attention-based modeling of client device 400. Note that even though the screen sizes of client device 300 and client device 400 are the same, text portion 402 of the image is much clearer as compared to the text 302 of FIG. 3. This is due to substantial optimization of the original image as a function of attention-modeling results, and selection of those portions of the image for presentation that have higher attention values in view of the target client resource constraints.

Figure 5:
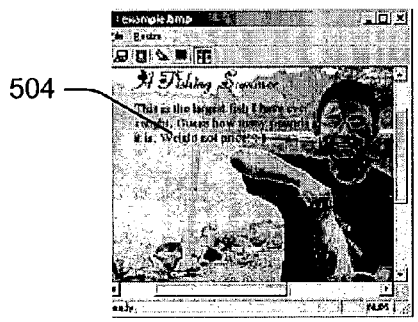
FIG. 5 shows an exemplary adapted image that was generated by attention-based modeling of an original image.

FIG. 5 shows an exemplary adapted image that was generated by the attention-based modeling of an original image. In particular, client device 500 represents client device 400 of FIG. 4 in a rotated, or landscape position. Such rotation causes the landscape viewing function of the client display screen to activate via a client device display driver. Responsive to such rotation, the coordinates of the display screen change and the content adaptation module 202 of FIG. 2 generates an adapted image 220 (FIG. 2) to present clear views of both the text 502 and the face 504. Accordingly, the content adaptation module adapts images to present the most important aspect(s) of the adapted image in view of client device resource constraints (e.g., size, positional nature/screen rotation, etc.), Visual Attention Modeling Turning to FIG. 2, further details of the operations used by the content adaptation module 202 to perform visual attention modeling of the image(s) 210-1 through 210-K are now described. In particular, the content adaptation module analyzes each image in view of multiple visual attention models to generate attention model data 208. In this implementation, the attention models include, for example, saliency, face, and text attention models. However, in another implementation, the content adaptation module is modified to integrate information generated from analysis of the image(s) via different attention model algorithms such as those described in:

U.S. patent application Ser. No. 10/286,053, titled "Systems and Methods for Generating a Comprehensive User Attention Model", filed on Nov. 1, 2002, commonly assigned herewith, and incorporated by reference; and U.S. patent application Ser. No. 10/285,933, titled "Systems and Methods for Generating a Motion Attention Model", filed on Nov. 1, 2002, commonly assigned herewith, and incorporated by reference.

Saliency Attention Modeling

The content adaptation module 202 generates three (3) channel saliency maps for each of the images 210-1 through 121-1. These saliency maps respectively identify color contrasts, intensity contrasts, and orientation contrasts. These saliency maps are represented as respective portions of attention data 208. Techniques to generate such maps are described in "A Model of Saliency-Based Visual Attention for Rapid Scene Analysis" by Itti et al., IEEE Transactions on Pattern Analysis and Machine Intelligence, 1998, hereby incorporated by reference.

The content adaptation module 202 then generates a final gray saliency map, which is also represented by attention data 208, by applying portions of the iterative method proposed in "A Comparison of Feature Combination Strategies for Saliency-Based Visual Attention Systems, Itti et al, Procedures of SPIE Human Vision and Electronic Imaging IV (HVEI'99), San Jose, Calif., Vol. 3644, pp. 473-82, January 1999, and hereby incorporated by reference. Saliency attention is determined via the final saliency map as a function of the number of saliency regions, and their brightness, area, and position in the gray saliency map.

To reduce image adaptation time, the content adaptation module 202 detects regions that are most attractive to human attention by binarizing the final saliency map. Such binarization is based on the following:

$$AV_{saliency} = \sum_{(i,j \in R)} B_{i,j} \cdot W^{i,j}_{saliency}, \tag{2}$$

wherein $B_{i,j}$ denotes the brightness of pixel point (i,j) in the saliency region R, $W_{saliency}^{pos_{i,j}}$ is the position weight of that pixel. Since people often pay more attention to the region near the image center, a normalized Gaussian template centered at the image is used to assign the position weight.

The size, the position and the brightness attributes of attended regions in the binarized or gray saliency map (attention data 208) decide the degree of human attention attracted. The binarization threshold is estimated in an adaptive manner. Since saliency maps are represented with arbitrary shapes with little semantic meaning. Thus, a set of MPS ratios 218 are predefined for each AO 212 that represented as a saliency map. The MPS thresholds can be manually assigned via user interaction or calculated automatically. For example, in one implementation, the MPS of a first region with complex textures is larger than the MPS of a second region with less complex texturing.

Face Attention Modeling

A person's face is generally considered to be one of the most salient characteristics of the person. Similarly, a dominant animal's face in a video could also attract viewer's attention. In light of this, it follows that the appearance of dominant faces in images 210 will attract a viewers' attention. Thus, a face attention model is applied to each of the images by the content adaptation module 202. Portions of attention data 208 are generated as a result, and include, for example, the number of faces, their respective poses, sizes, and positions.

A real-time face detection technique is described in "Statistical Learning of Multi-View Face Detection", by Li et al., Proc. of EVVC 2002; which is hereby incorporated by reference. In this implementation, seven (7) total face poses (with out-plane rotation) can be detected, from the frontal to the profile. The size and position of a face usually reflect the importance of the face. Hence, $$AV_{face} = \sqrt{Area_{face}} \times W_{face}^{pos}, \quad (3)$$

wherein $Area_{face}$ denotes the size of a detected face region and $w_{face}^{pos}$ is the weight of its position. In one implementation, the MPS 218 attribute of an AO 212-1 through 212-N face attention model is a predefined absolute pixel area size. For instance, a face with an area of 25×30 pixels in size will be visible on many different types of devices.

Text Attention Modeling

Similar to human faces, text regions also attract viewer attention in many situations. Thus, they are also useful in deriving image attention models. There have been so many works on text detection and recognition and localization accuracy can reach around 90% for text larger than ten (10) points. By adopting a text detection, the content adaptation module 202 finds most of the informative text regions inside images 210-1 through 210-K. Similar to the face attention model, the region size is also used to compute the attention value 214 of a text region. In addition, the aspect ratio of region in included in the calculation in consideration that important text headers or titles are often in an isolated single line with large heights whose aspect ratios are quite different from text paragraph blocks. In light of this, the attention value for a text region is expressed as follows:

$$AV_{text} = \sqrt{Area_{text}} \times W_{AspectRatio} \quad (4).$$

$Area_{text}$ denotes the size of a detected text region, and $W_{AspectRatio}$ is the weight of its aspect ratio generated by some heuristic rules. The MPS 218 of a text region (AO 212) can be predefined according to a determined font size, which can be calculated by text segmentation from the region size of text. For example, the MPS of normal text can be assigned from a specific 10 points font size in height.

Attention Model Adjustment—Post Processing

Before integrating the multiple visual attention measurements, the content adaptation module 202 adjusts each AO's 212 respective attention value (AV) 216. In one implementation, for purposes of simplicity, this is accomplished via a rule-based approach. For example, respective AO AV values in each attention model are normalized to (0, 1), and the final attention value is computed as follows:

$$AV_i = w_k \cdot \overline{AV_i^k}, \quad (5)$$

wherein $w_k$ is the weight of model k and $\overline{AV_i^k}$ is the normalized attention value of $AO_i$ detected in the model k, e.g. saliency model, face model, text model, or any other available model.

When adapting images contained in a composite content 206 such as a Web page, image 210 contexts are quite influential to user attention. To accommodate this variation in modeling image attentions, the content adaptation module 202 implements Function-based Object Model (FOM) to understand a content author's intention for each object in a Web page. Such FOM is described in Chen J. L., Zhou B. Y., Shi J., Zhang H. J. and Wu Q. F. (2001), Function-based Object Model Towards Website Adaptation, Proc. of the 10th Int. WWW Conf. pp. 587-596, hereby incorporated by reference. For example, images in a Web page may have different functions, such as information, navigation, decoration or advertisement, etc. By using FOM analysis, the context of an image can be detected to assist image attention modeling.

Attention-Based Image Adaptation

Operations to find an optimal image adaptation of content 206 that has been modeled with respect to visual attention, wherein the optimal image adaptation is a function of resource constraints of a target client device, are now described using integer programming and a branch-and-bound algorithm.

Information Fidelity

Information fidelity is the perceptual 'look and feel' of a modified or adapted version of content (or image), a subjective comparison with the original content 206 (or image 210). The value of information fidelity is between 0 (lowest, all information lost) and 1 (highest, all information kept just as original). Information fidelity gives a quantitative evaluation of content adaptation that the optimal solution is to maximize the information fidelity of adapted content under different client context constraints. The information fidelity of an individual AO 212 after adaptation is decided by various parameters such as spatial region size, color depth, ratio of compression quality, etc.

For an image region R consisting of several AOs 212, the resulting information fidelity is the weighted sum of the information fidelity of all AOs in R. Since user's attention on objects always conforms to their importance in delivering information, attention values of different AOs are employed as the informative weights of contributions to the whole perceptual quality. Thus, the information fidelity of an adapted result can be described as $$IF_R = \sum_{ROI_i \subset R} AV_i \cdot IF_{AO_i} \quad (6)$$

Adapting Images on Small Displays

Given the image attention model, now let us consider how to adapt an image 210 to fit into a small screen which is often the major limitation of mobile devices. For purposes of discussion, such a mobile device or other client device is represented by computing device 130 of FIG. 1 or remote computing device 182, which is also located in FIG. 1. The small screen is represented in this example via display 176 or 190 of FIG. 1. It can be appreciated that when the computing device is a handheld, mobile, or other small footprint device that the display size may be much smaller (e.g., several centimeters in diameter) than a computer monitor screen. We address the problem of making the best use of a target area T to represent images while maintaining their original spatial ratios. Various image adaptation schemes can be applied to obtain different results. For each adapted result, there is a corresponding unique solution which can be presented by a region R in the original image. In other words, an adapted result is generated from the outcome of scaling down its corresponding region R. As screen size is our main focus, we assume the color depth and compression quality does not change in our adaptation scheme.

Figure 6:
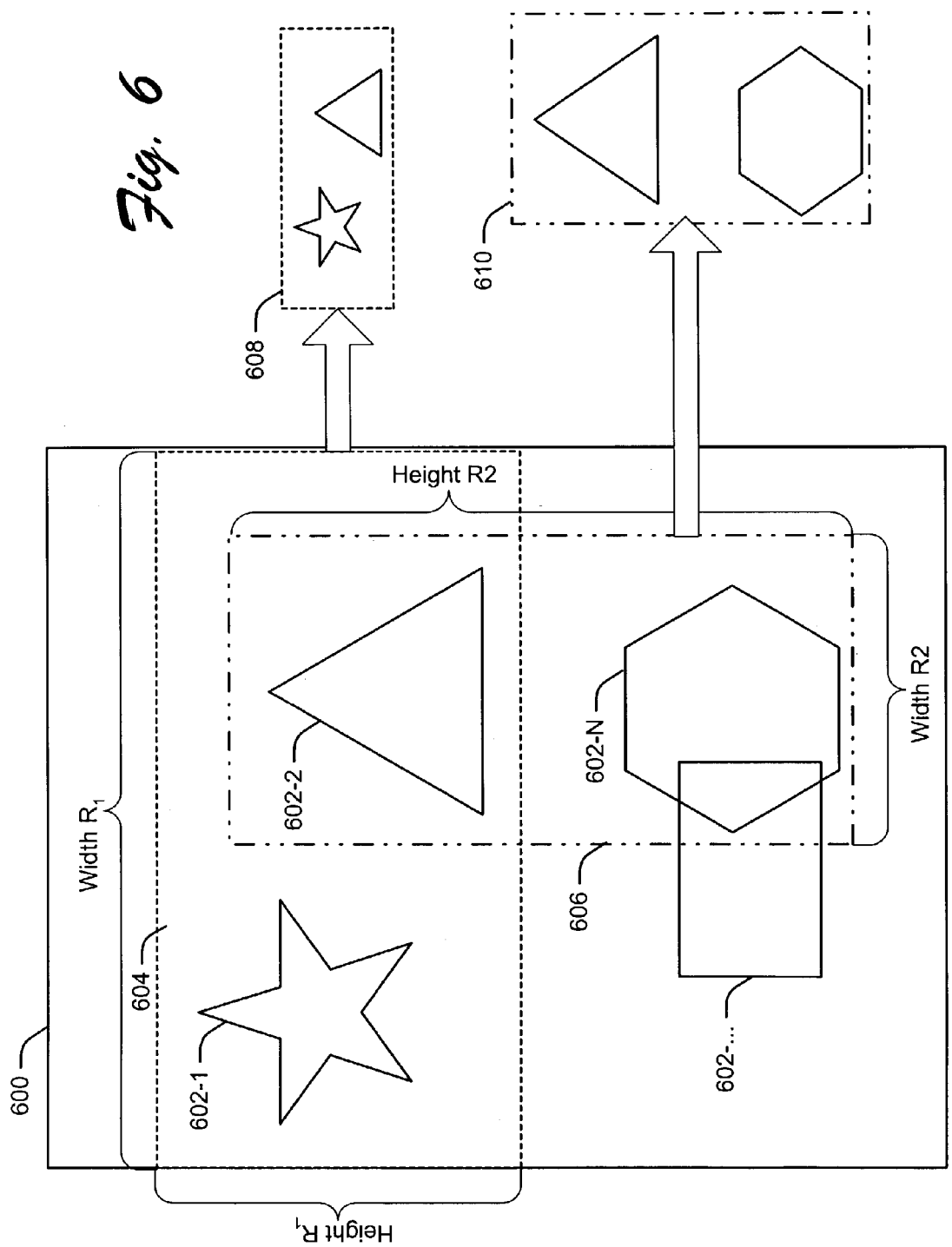
FIG. 6 shows that image attention objects are segmented into regions and respectively adapted to presentation characteristics of a client display target area.

FIG. 6 shows that image attention objects (AOs) are segmented into regions and respectively adapted to presentation characteristics of a client display target area. For purposes of discussion, the image 600 is one of the images 210-1 through 210-K of FIG. 2, and the AOs 602 represent respective ones of the AOs 212-1 through 212-N of FIG. 2. In this example, image regions include region 604 and region 606. Region 604 encapsulates AOs 602-1 and 602-2 and has a height $R_1$ and width $R_1$. Region 606 encapsulates AOs 602-2 and 602-K and has a height $R_2$ and width $R_2$. For purposes of discussion, regions 604 and 606 are shown as respective rectangles. However, in other implementations a region is not a rectangle but some other geometry.

In this example, region 604 has been adapted to region 608 by the content adaptation module 202 of FIG. 2, and region 606 has been adapted to region 610. In both cases of this example, note that the adapted region is dimensionally smaller in size than its corresponding parent region. However, as a function of the particular characteristics of the image and the target area of the client device, it is possible for an adapted region to be larger than the regions from which it was adapted. In other words, each region of an image is adapted as a function of the specific target area of the client device that is going to be used to present the content and the desired image fidelity, which is expressed as follows:

According to Equation (6), an objective measure for the information fidelity of an adapted image is formulated as follows:

$$IF_R = \sum_{ROI_i \subset R} AV_i \cdot IF_{AO_i} \qquad (7)$$
$$= \sum_{ROI_i \subset R} AV_i \cdot u(r_R^2 \cdot size(ROI_i) - MPS_i)$$

where u(x) is defined as $$u(x) = \begin{cases} 1, & \text{if } x \geq 0 \\ 0, & \text{otherwise} \end{cases}.$$

Function size (x) calculates the area of a ROI, and $r_R$ denotes the ratio of image scaling down, which is computed as $$r_R = \min\left(\frac{Width_T}{Width_R}, \frac{Height_T}{Height_R}\right) \qquad (8)$$

$Width_T$, $Height_T$, $Width_R$, and $Height_R$ represent the widths and heights of target area T and solution region R, respectively. As shown in FIG. 6, when adapting an image to different target areas, the resulting solution regions may be different.

This quantitative value is used to evaluate all possible adaptation schemes to select the optimal one, that is, the scheme achieving the largest IF value. Taking the advantage of our image attention model, we transform the problem of making adaptation decision into the problem of searching a region within the original image that contains the optimal AO set (i.e. carries the most information fidelity), which is defined as follows:

$$\max_R \left\{ \sum_{ROI_i \subset R} AV_i \cdot u(r_R^2 \cdot size(ROI_i) - MPS_i) \right\} \qquad (9)$$

The Image Adaptation Algorithm

For an image 210 (FIG. 2) with width m and height n, the complexity for finding the optimal solution of (9) is $O(m^2n^2)$ because of the arbitrary location and size of a region. Since m and n may be quite large, the computational cost could be expensive. However, since the information fidelity of adapted region is solely decided by its attention objects 212, we can greatly reduce the computation time by searching the optimal AO set before generating the final solution.

Determining a Valid Attention Object Set

We introduce I as a set of AOs, $I \subset \{AO_1, AO_2, \ldots AO_N\}$. Thus, the first step of optimization is to find the AO set that carries the largest information fidelity after adaptation. Let us consider $R_I$, the tight bounding rectangle containing all the AOs in I. We can first adapt $R_I$ to the target area T, and then generate the final result by extending $R_I$ to satisfy the requirements.

All of the AOs within a given region R may not be perceptible when scaling down R to fit a target area T. Thus, to reduce the solution space, an attention object set is valid if:

$$\frac{MPS_i}{size(ROI_i)} \leq r_I^2, \quad \forall AO_i \in I, \qquad (10)$$

wherein $r_I$ ($r_I$ is equivalent to $r_{R_I}$ in Equation (8) for simplicity) is the ratio of scaling down when adapting the tight bounding rectangle $R_I$ to T, which can be computed as follows:

$$r_I = \min\left(\frac{Width_T}{Width_I}, \frac{Height_T}{Height_I}\right) \qquad (11)$$
$$= \min\left(\frac{Width_T}{\max_{AO_i, AO_j \in I} |Right_i - Left_j|}, \frac{Height_T}{\max_{AO_i, AO_j \in I} |Bottom_i - Top_j|}\right).$$

Herein, $Width_I$ and $Height_I$ denote the width and height of $R_I$, while $Left_i$, $Right_i$, $Top_i$, and $Bottom_i$ are the four bounding attributes of the $i^{-th}$ attention object.

$r_I$ in equation 10 is used to check scaling ratio, which should be greater than $\sqrt{MPS_i/size(ROI_i)}$ for any $AO_i$ belonging to a valid I. This ensures that all AO included in I is perceptible after scaled down by a ratio $r_I$. For any two AO sets $I_1$ and $I_2$, there has $r_{I_1} \geq r_{I_2}$, if $I_1 \subset I_2$. Thus, it is straightforward to infer the following property of validity from equation 10. If $I_1 \subset I_2$ and $I_1$ is invalid, then $I_2$ is invalid (property 1).

With the definition of valid attention object set, the problem of Equation (9) is further simplified as follows:

$$\max_I (IF_I) = \max_I \left( \sum_{AO_i \in I} AV_i \cdot u(r_I^2 \cdot size(ROI_i) - MPS_i) \right) \quad (12)$$

$$= \max_I \left( \sum_{AO_i \in I} AV_i \right) \quad \forall \text{ valid } I \subset \{AO_1, AO_2, \ldots AO_N\}$$

As can be seen, this has become an integer programming problem and the optimal solution is found via use of a branch and bound algorithm.

Branch and Bound Process

Figure 7:
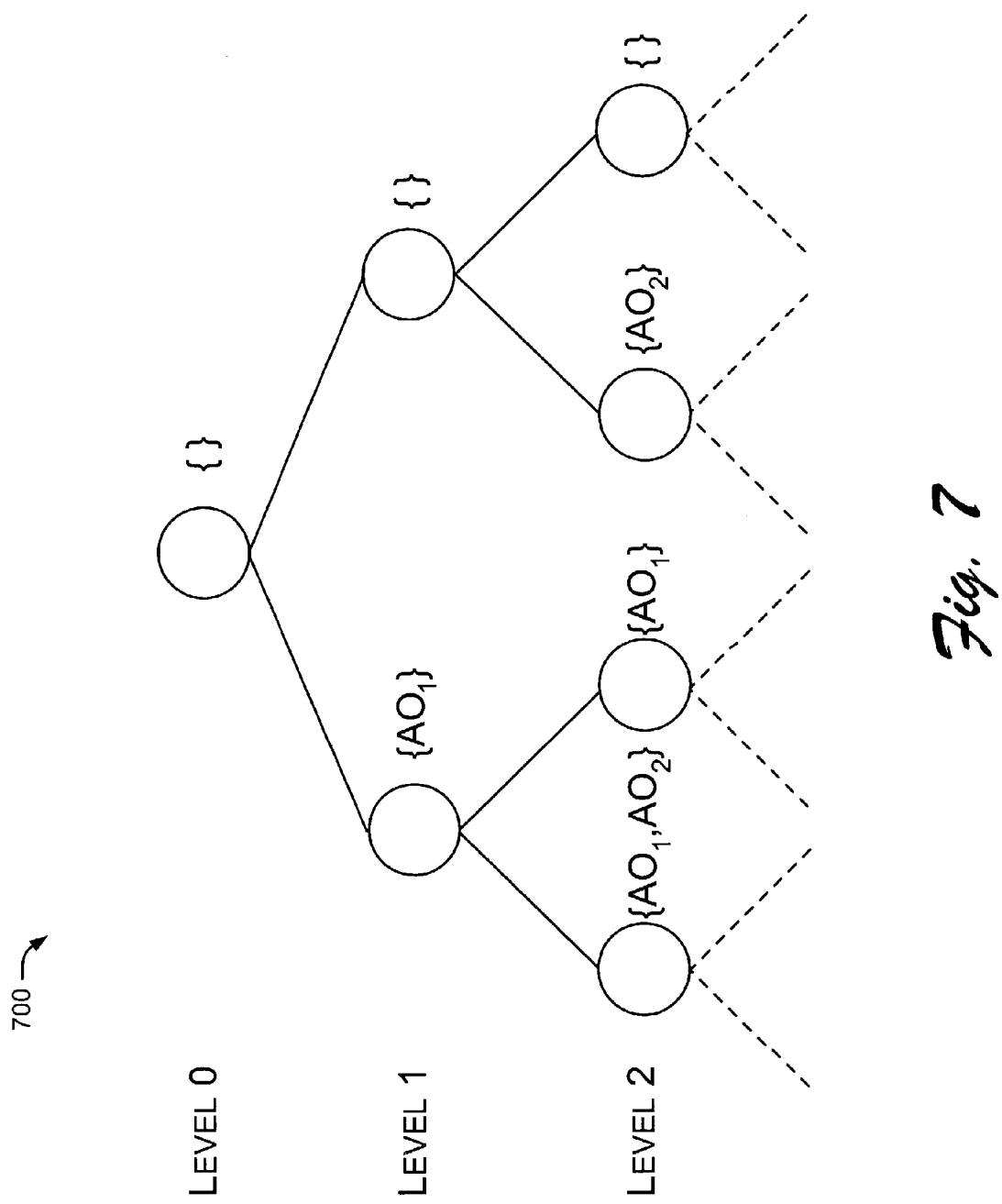
FIG. 7 shows a binary tree to illustrate a branch and bound process to identify an optimal image adaptation solution.

FIG. 7 shows a binary tree 700 to illustrate a branch and bound process to identify an optimal image adaptation solution. Each level 0-2 of the binary tree includes different sets of AOs 212-1 through 212-N. Each node of the binary tree denotes zero or more specific sets of AOs. Each bifurcation of the binary tree represents a decision/opportunity to keep or drop AO(s) of the next level. The height of the binary tree corresponds to K, the number of AOs inside the particular image (i.e., one of the images 210-1 through 210-K of FIG. 2). Each leaf node in this tree corresponds a different possible I.

For each node in the binary AO tree 700, there is a boundary on the possible IF value it can achieve among all of its sub-trees. The lower boundary is just the IF value currently achieved when none of the unchecked AOs can be added (i.e., the sum of IF values of AOs included in current configuration). The upper boundary is the addition of all IF values of those unchecked AOs after current level (i.e., the sum of IF values of all AOs in the image except those dropped before current level).

Whenever the upper bound of a node is smaller than the best IF value currently achieved, the whole sub-tree of that node is truncated. At the same time, for each node we check the ratio $r_I$ of its corresponding AO set I to verify its validity. If it is invalid, according to property 1, the whole sub-tree of that node is also truncated. By checking both the bound on possible IF value and the validity of each AO set, the computation cost is greatly reduced.

A number of techniques can be used to reduce binary tree 700 traversal time. For instance, arranging the AOs are arranged in decreasing order of their AVs at the beginning of search will decrease traversal times, since in most cases only a few AOs contribute the majority of IF value. Additionally, when moving to a new level k, it is determined whether $AO_k$ is already included in current configuration. If so, travel the branch of keeping $AO_k$ and prune the one of dropping $AO_k$ and all sub-branches.

Transform to Adapted Solution

After finding the optimal AO set $I_{opt}$, the content adaptation module 202 of FIG. 2 generates different possible solutions according to different requirements by extending $R_{I_{opt}}$ while keeping $I_{opt}$ valid. For instance, if an image 210-1 through 210-K has some background information which is not included in the attention model 208, the adapted result may present a region as large as possible by extending $R_{I_{opt}}$. The scaling ratio of final solution region is $$r_{I_{opt}}^{\max} = \max_{AO_i \in I_{opt}} (MPS_i / size(ROI_i))$$

to keep $I_{opt}$ valid as well as to obtain the largest area. Therefore, $R_{I_{opt}}$ is extended to a region determined by $$r_{I_{opt}}^{\max}$$

and T, within the original image.

In other cases, the adapted images 220 may be more satisfactory with higher resolution than larger area. To this end, $R_{I_{opt}}$ is extended, while keeping the scaling ratio at $r_{I_{opt}}$ instead of $$r_{I_{opt}}^{\max}.$$

However, it is worth noticing that in this situation, the scaled version of whole image will perhaps never appear in adapted results.

Sometimes a better view of an image 210, or portions thereof, can be achieved when a display screen is rotated by ninety (90) degree. In such a case, $I_{opt}'$ carries more information than $I_{opt}$. In this case, we compare the result with the one for the rotated target area, and then select the better one as the final solution.

The complexity of this algorithm is exponential with the number of attention objects 212 within an image 210. However, the described techniques are efficiently performed because the number of attention objects in an image is often less than a few dozen and the corresponding attention values 214 are always distributed quite unevenly among attention objects.

An Exemplary Procedure

Figure 8:
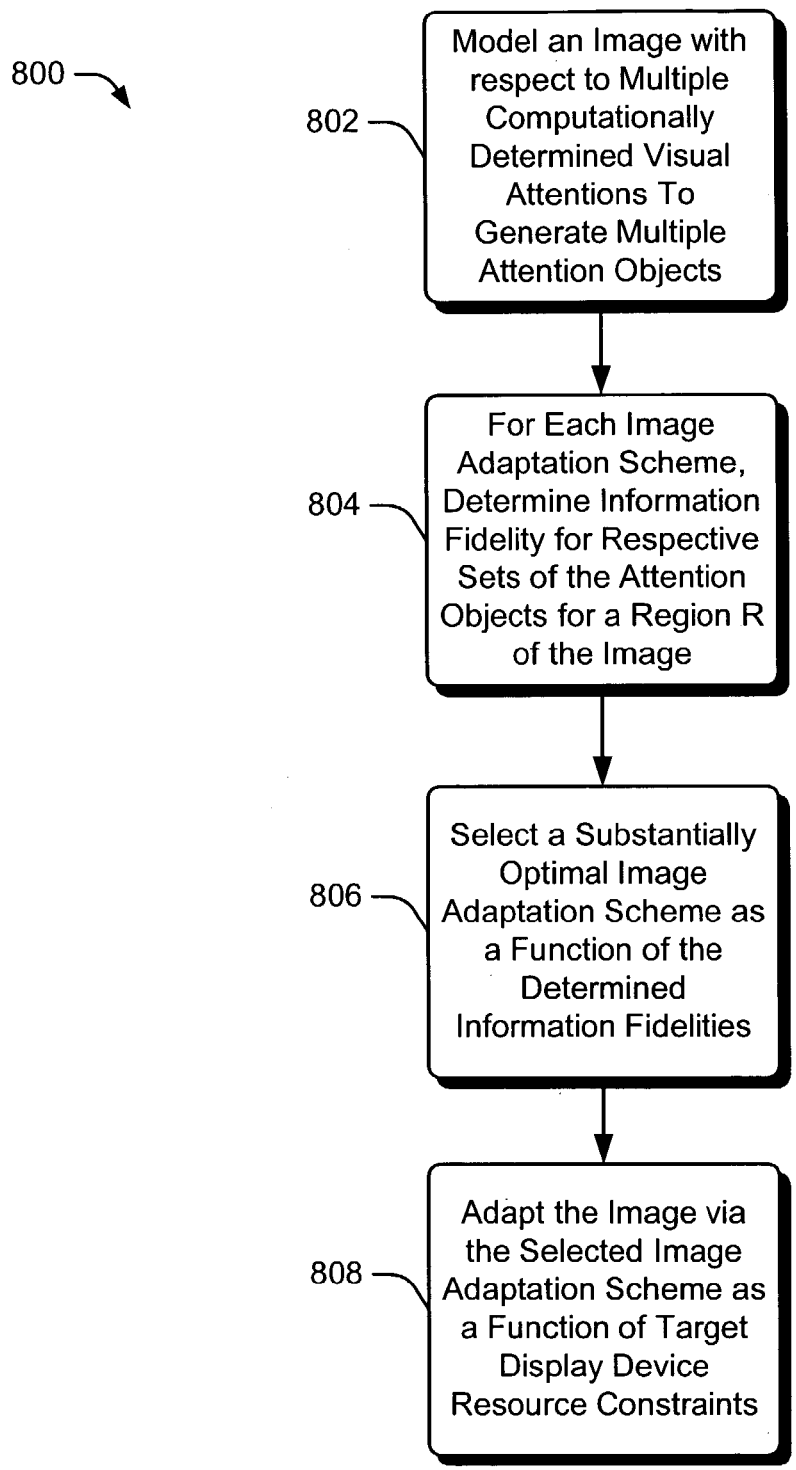
FIG. 8 shows an exemplary procedure for enhanced image adaptation in view of client resource constraints.

FIG. 8 shows an exemplary procedure 800 for enhanced image adaptation in view of client resource constraints. For purposes of discussion, the operations of this procedure are described in reference to the program module and data components of FIGS. 1 and 2. At block 802, the content adaptation module 202 (FIG. 2) models an image 210 modeled with respect to multiple visual attentions (e.g., saliency, face, text, etc.) to generate respective attention objects (AOs) 212 for each of the visual attentions. At block 804, for each of one or more possible image adaptation schemes (e.g., resolution reduction, compression, etc.), the content adaptation module determines an objective measure of information fidelity (IF) for a region R of the image. The objective measures are determined as a function of a resource constraint of the display device (e.g., displays 172 or 190 of FIG. 1) and as a function of a weighted sum of IF of each AO in the region R. (Such objective measures and weighted sums are represented as respective portions of "other data" 222 of FIG. 2). At block 806, the content adaptation module selects a substantially optimal image adaptation scheme as a function of the calculated objective measures. At block 808, the content adaptation module adapts the image via the selected substantially optimal adaptation scheme to generate an adapted image 220 (FIG. 2) as a function of at least the target area of the client display.

CONCLUSION

The described systems and methods use attention modeling and other objective criteria for enhanced image adaptation in view of client resource constraints. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A method for enhanced image adaptation for a display device having a target area T, the method comprising:
   modeling an image with respect to a plurality of visual attentions to generate a respective set of attention objects for each attention of the visual attentions;
   assigning a respective attention value to each attention object, the attention value indicating a relative importance of image information represented by the attention object as compared to other ones of the attention objects;
   indicating a respective weight for each of the visual attentions;
   for each visual attention, adjusting assigned attention values of corresponding attention objects based on corresponding visual attention weight, the adjusting comprising:
      normalizing the assigned attention values to a unit interval; and
      computing adjusted attention values according to:

$$AV_i = w_k \cdot AV_i^k,$$

wherein $AV_i$ is an adjusted attention value for attention object i derived from a visual attention model k, $w_k$ is a weight of the visual attention model k, and $AV_i^k$ is a normalized attention value of attention object $AO_i$ detected for the visual attention model k;
   for each of one or more image adaptation schemes, determining a respective objective measure of information fidelity (IF) of a region R of the image as a function of a resource constraint of the display device and as a function of a weighted sum of IF of a value of each attention object ($AO_i$) in the region R;
   selecting a substantially optimal adaptation scheme from among the one or more image adaptation schemes, each image adaptation scheme ranked as a function of, at least, its determined objective measure of information fidelity IF with respect to the region R; and
   adapting the image via the substantially optimal adaptation scheme to generate an adapted image as a function of at least the target area T.

2. A method as recited in claim 1, wherein the multiple visual attentions are based on saliency, face, and text attention models.

3. A method as recited in claim 1, wherein each objective measure is unique as compared to each other objective measure(s).

4. A method as recited in claim 1, wherein resource constraint comprises one or more of spatial region size (T), color depth, and/or ratio of compression.

5. A method as recited in claim 1, wherein the image is contained in composite content comprising other images, and wherein modeling the image further comprises determining a context of the image as compared to respective contexts of the other images to assist in determining attention object attributes of the image.

6. A method as recited in claim 1, wherein the weighted sum of information fidelity (IF) of each (i) attention object (AO) in the region R is based on:

$$IF_R = \sum_{ROI_i \subset R} AV_i \cdot IF_{AO_i};$$

and
   wherein $ROI_i$ is a spatial size of $AO_i$.

7. A method as recited in claim 1, wherein selecting the substantially optimal adaptation scheme further comprises searching a region of the image for an attention object set that represents higher IF after adaptation as compared to collective IF values of other attention object sets after adaptation.

8. A method as recited in claim 1, wherein selecting the substantially optimal adaptation scheme further comprises calculating the substantially optimal adaptation scheme via integer programming and use of a branch and bound algorithm.

9. A method as recited in claim 1, wherein selecting the substantially optimal adaptation scheme is based on the following:

$$\max_I(IF_I) = \max_I \left( \sum_{AO_i \in I} AV_i \cdot u(r_I^2 \cdot size(ROI_i) - MPS_i) \right)$$

$$= \max_I \left( \sum_{AO_i \in I} AV_i \right) \quad \forall \text{ valid } I \subset \{AO_1, AO_2, \ldots AO_N\}; \text{ and}$$

wherein I is a set of AOs, ROI is a spatial size of $AO_i$, and $MPS_i$ is a minimal perceptible size beyond which $AO_i$ is not to be reduced.

10. A method as recited in claim 1, wherein adapting the image via the substantially optimal adaptation scheme to generate an adapted image further comprises iteratively scaling the region R to a region r comprising a determined set of optimal attention objects ($I_{opt}$) by extending and/or contracting the region while keeping $I_{opt}$ valid.

11. A method as recited in claim 1, wherein adapting the image further comprises scaling the region R to a region r comprising a determined set of optimal attention objects ($I_{opt}$) according to the following scaling equation:

$$r_{I_{opt}}^{\max} = \max_{AO_i \in I_{opt}} (MPS_i / size(ROI_i));$$

wherein $MPS_i$ is the Minimal Perceptible Size of $AO_i$, wherein $ROI_i$ is a spatial area of $AO_i$ in the image; and
   wherein the sealing equation is solved such that $I_{opt}$ remains valid and such that the region r is scaled to a largest region within target area T.

12. A method as recited in claim 1, wherein adapting the image further comprises seating the region R comprising a determined set of optimal attention objects ($I_{opt}$) such that $I_{opt}$ remains valid and such that the region R is scaled to a highest resolution to fit within target area T.

13. A method as recited in claim 1, wherein the weighted sum of information fidelity (IF) of each (i) attention object (AO) in the region R is based on:

$$IF_R = \sum_{ROI_i \subset R} AV_i \cdot IF_{AO_i}$$
$$= \sum_{ROI_i \subset R} AV_i \cdot u(r_R^2 \cdot size(ROI_i) - MPS_i);$$

wherein u(x) is defined as $$u(x) = \begin{cases} 1, & \text{if } x \geq 0 \\ 0, & \text{otherwise} \end{cases};$$

and
wherein $ROI_i$ is a spatial size of $AO_i$, wherein size(x) calculates the spatial size, and $r_R$ denotes a ratio of image scaling down.

14. A method as recited in claim 13, wherein the ratio of image scaling down is computed as follows:

$$r_R = \min\left(\frac{Width_T}{Width_R}, \frac{Height_T}{Height_R}\right);$$

and
wherein $Width_T$, $Height_T$, $Width_R$, and $Height_R$ represent widths and heights of target area T and solution region R, respectively.

15. A computer-readable medium storing computer-executable instructions for enhanced image adaptation for a display device having a target area T, the computer-executable instructions comprising instructions for:
modeling an image with respect to a plurality of visual attentions to generate a respective set of attention objects for each attention of the visual attentions;
for each of one or more image adaptation schemes, determining a respective objective measure of information fidelity (IF) of a region R of the image as a function of, at least:
a resource constraint of the display device; and
a weighted sum of an information fidelity of each attention object ($AO_i$) in the region R based on:

$$IF_R = \sum_{ROI_i \subset R} AV_i \cdot IF_{AO_i},$$

wherein $IF_R$ corresponds to the weighted sum, $ROI_i$ is a spatial size of the attention object $AO_i$, $AV_i$ is a value of the attention object $AO_i$, and $IF_{AOi}$ is the information fidelity of the attention object $AO_i$;
selecting a substantially optimal adaptation scheme from among the one or more image adaptation schemes, each image adaptation scheme ranked as a function of, at least, its determined objective measure of information fidelity IF with respect to the region R; and
adapting the image via the substantially optimal adaptation scheme to generate an adapted image as a function of at least the target area T.

16. A computer-readable medium as recited in claim 15, wherein the multiple visual attentions are based on saliency, face, and text attention models.

17. A computer-readable medium as recited in claim 15, wherein each objective measure is unique as compared to each other objective measure(s).

18. A computer-readable medium as recited in claim 15, wherein resource constraint comprises one or more of spatial region size (T), color depth, and/or ratio of compression.

19. A computer-readable medium as recited in claim 15, wherein the image is contained in composite content comprising other images, and wherein the instructions for modeling the image further comprises determining a context of the image as compared to respective contexts of the other images to assist in determining attention object attributes of the image.

20. A computer-readable medium as recited in claim 15, and wherein the computer-executable instructions further comprise instructions for:
assigning a respective attention value to each attention object, the attention value indicating a relative importance of image information represented by the attention object as compared to other ones of the attention objects;
indicating a respective weight for each of the visual attentions; and
for each visual attention, adjusting assigned attention values of corresponding attention objects based on corresponding visual attention weight.

21. A computer-readable medium as recited in claim 20, wherein the instructions for adjusting assigned attention values further comprise instructions for:
normalizing the assigned attention values to (0, 1); and
computing adjusted attention values as follows:

$$AV_i = w_k \cdot \overline{AV_i^k},$$

wherein $AV_i$ is an adjusted attention value for attention object i derived from visual attention model k, $w_k$ is the weight of the visual attention model k, and $\overline{AV_i^k}$ is a normalized mention value of attention object $AO_i$ detected in the visual attention model k.

22. A computer-readable medium as recited in claim 15, wherein the instructions for selecting the substantially optimal adaptation scheme further comprise instructions for searching a region of the image for an attention object set that represents higher IF after adaptation as compared to collective IF values of other attention object sets after adaptation.

23. A computer-readable medium as recited in claim 15, wherein the instructions for selecting the substantially optimal adaptation scheme further comprise instructions for calculating the substantially optimal adaptation scheme via integer programming and use of a branch and bound algorithm.

24. A computer-readable medium as recited in claim 15, wherein the instructions for selecting the substantially optimal adaptation scheme is based on the following:

$$\max_I(IF_I) = \max_I\left(\sum_{AO_i \in I} AV_i \cdot u(r_I^2 \cdot size(ROI_i) - MPS_i)\right)$$

-continued $$= \max_{I}\left(\sum_{AO_i \in I} AV_i\right) \quad \forall \text{ valid } I \subset \{AO_1, AO_2, \ldots AO_N\}; \text{ and}$$

wherein I is a set of AOs, ROI is a spatial size of $AO_i$, and $MPS_i$ is a minimal perceptible size beyond which $AO_i$ is not to be reduced.

25. A computer-readable medium as recited in claim 15, wherein the instructions for adapting the image further comprise instructions for iteratively scaling the region R to a region r comprising a determined set of optimal attention objects ($I_{opt}$) by extending and/or contracting the region while keeping $I_{opt}$ valid.

26. A computer-readable medium as recited in claim 15, wherein the instructions for adapting the image further comprise instructions for scaling the region R to a region r comprising a determined set of optimal attention objects ($I_{opt}$) according to the following scaling equation:

$$r_{I_{opt}}^{\max} = \max_{AO_i \in I_{opt}} (MPS_i / \text{size}(ROI_i));$$

wherein $MPS_i$ is the Minimal Perceptible Size of $AO_i$, wherein $ROI_i$ is a spatial area of $AO_i$ in the image; and wherein the scaling equation is solved such that $I_{opt}$ remains valid and such that the region r is scaled to a largest region within target area T.

27. A computer-readable medium as recited in claim 15, wherein the instructions for adapting the image further comprise instructions for scaling the region R comprising a determined set of optimal attention objects ($I_{opt}$) such that $I_{opt}$ remains valid and such that the region R is scaled to a highest resolution to fit within target area T.

28. A computer-readable medium as recited in claim 15, wherein the weighted sum of information fidelity (IF) of each (i) attention object (AO) in the region R is based on:

$$IF_R = \sum_{ROI_i \subset R} AV_i \cdot IF_{AO_i}$$

$$= \sum_{ROI_i \subset R} AV_i \cdot u(r_R^2 \cdot \text{size}(ROI_i) - MPS_i);$$

wherein u(x) is defined as $$u(x) = \begin{cases} 1, & \text{if } x \geq 0 \\ 0, & \text{otherwise} \end{cases};$$

and wherein $ROI_i$ is a spatial size of $AO_i$, wherein size(x) calculates the spatial size, and $r_R$ denotes a ratio of image scaling down.

29. A computer-readable medium as recited in claim 28, wherein the ratio of image scaling down is computed as follows:

$$r_R = \min\left(\frac{Width_T}{Width_R}, \frac{Height_T}{Height_R}\right);$$

and wherein $Width_T$, $Height_T$, $Width_R$, and $Height_R$ represent widths and heights of target area T and solution region R, respectively.

30. A computing device for enhanced image adaptation for a display device having a target area T, the computing device comprising:

a processor; and a memory coupled to the processor, the memory comprising computer-program executable instructions executable by the processor for, at least:

modeling an image with respect to a plurality of visual attentions to generate a respective set of attention objects for each attention of the visual attentions;

for each of one or more image adaptation schemes, determining a respective objective measure of information fidelity (IF) of a region R of the image as a function of, at least:

a resource constraint of the display device; and a weighted sum of an information fidelity of each attention object ($AO_i$) in the region R;

selecting a substantially optimal adaptation scheme from among the one or more image adaptation schemes, each image adaptation scheme ranked as a function of, at least, its determined objective measure of information fidelity IF with respect to the region R; and adapting the image via the substantially optimal adaptation scheme to generate an adapted image as a function of at least the target area T, the adapting comprising:

scaling the region R to a region r comprising a determined set of optimal attention objects ($I_{opt}$) according to the following scaling equation:

$$r_{I_{opt}}^{\max} = \max_{AO_i \in I_{opt}} (MPS_i / \text{size}(ROI_i));$$

wherein $MPS_i$ is a minimum perceptible size of $AO_i$, and $ROI_i$ is a spatial area of $AO_i$ in the image; and wherein the scaling equation is solved such that $I_{opt}$ remains valid and such that the region r is scaled to a largest region within the target area T.

31. A computing device as recited in claim 30, wherein the multiple visual attentions are based on saliency, face, and text attention models.

32. A computing device as recited in claim 30, wherein each objective measure is unique as compared to each other objective measure(s).

33. A computing device as recited in claim 30, wherein resource constraint comprises one or more of spatial region size (T), color depth, and/or ratio of compression.

34. A computing device as recited in claim 30, wherein the image is contained in composite content comprising other images, and wherein the instructions for modeling the image further comprises determining a context of the image as compared to respective contexts of the other images to assist in determining attention object attributes of the image.

35. A computing device as recited in claim 30, and wherein the computer-executable instructions further comprise instructions for:

assigning a respective attention value to each attention object, the attention value indicating a relative importance of image information represented by the attention object as compared to other ones of the attention objects;

indicating a respective weight for each of the visual attentions; and for each visual attention, adjusting assigned attention values of corresponding attention objects based on corresponding visual attention weight.

36. A computing device as recited in claim 35, wherein the instructions for adjusting assigned attention values further comprise instructions for:

normalizing the assigned attention values to (0, 1); and computing adjusted attention values as follows:

$$AV_i = w_k \cdot \overline{AV_i^k},$$

wherein $AV_i$ is an adjusted attention value for attention object i derived from visual attention model k, $w_k$ is the weight of the visual attention model k, and $\overline{AV_i^k}$ is a normalized attention value of attention object $AO_i$ detected in the visual attention model k.

37. A computing device as recited in claim 30, wherein the weighted sum of information fidelity (IF) of each (i) attention object (AO) in the region R is based on:

$$IF_R = \sum_{ROI_i \subset R} AV_i \cdot IF_{AO_i};$$

and wherein $ROI_i$ is a spatial size of $AO_i$.

38. A computing device as recited in claim 30, wherein the instructions for selecting the substantially optimal adaptation scheme further comprise instructions for searching a region of the image for an attention object set that represents higher IF after adaptation as compared to collective IF values of other attention object sets after adaptation.

39. A computing device as recited in claim 30, wherein the instructions for selecting the substantially optimal adaptation scheme further comprise instructions for calculating the substantially optimal adaptation scheme via integer programming and use of a branch and bound algorithm.

40. A computing device as recited in claim 30, wherein the instructions for selecting the substantially optimal adaptation scheme is based on the following:

$$\max_I (IF_I) = \max_I \left( \sum_{AO_i \in I} AV_i \cdot u(r_I^2 \cdot size(ROI_i) - MPS_i) \right)$$

$$= \max_I \left( \sum_{AO_i \in I} AV_i \right) \forall \text{ valid } I \subset \{AO_1, AO_2, \ldots AO_N\}; \text{ and}$$

wherein I is a set of AOs, ROI is a spatial size of $AO_i$, and $MPS_i$ is a minimal perceptible size beyond which $AO_i$ is not to be reduced.

41. A computing device as recited in claim 30, wherein the instructions for adapting the image further comprise instructions for iteratively scaling the region R to a region r comprising a determined set of optimal attention objects ($I_{opt}$) by extending and/or contracting the region while keeping $I_{opt}$ valid.

42. A computing device as recited in claim 30, wherein the instructions for adapting the image further comprise instructions for scaling the region R comprising a determined set of optimal attention objects ($I_{opt}$) such that $I_{opt}$ remains valid and such that the region R is scaled to a highest resolution to fit within target area T.

43. A computing device as recited in claim 30, wherein the weighted sum of information fidelity (IF) of each (i) attention object (AO) in the region R is based on:

$$IF_R = \sum_{ROI_i \subset R} AV_i \cdot IF_{AO_i}$$

$$= \sum_{ROI_i \subset R} AV_i \cdot u(r_R^2 \cdot size(ROI_i) - MPS_i);$$

wherein u(x) is defined as $$u(x) = \begin{cases} 1, & \text{if } x \geq 0 \\ 0, & \text{otherwise} \end{cases}; \text{ and}$$

wherein $ROI_i$ is a spatial size of $AO_i$, wherein size(x) calculates the spatial size, and $r_R$ denotes a ratio of image scaling down.

44. A computing device as recited in claim 43, wherein the ratio of image scaling down is computed as follows:

$$r_R = \min\left( \frac{Width_T}{Width_R}, \frac{Height_T}{Height_R} \right); \text{ and}$$

wherein $Width_T$, $Height_T$, $Width_R$, and $Height_R$ represent widths and heights of target area T and solution region R, respectively.

45. A computer-implemented system for enhanced image adaptation for a display device having a target area T, the system comprising one or more program modules configured to, at least:

model an image with respect to a plurality of visual attentions to generate a respective set of attention objects for each attention of the visual attentions;

determine, for each of one or more image adaptation schemes, a respective objective measure of information fidelity (IF) of a region R of the image as a function of, at least:

a resource constraint of the display device; and a weighted sum of an information fidelity of each attention object ($AO_i$) in the region R;

select a substantially optimal adaptation scheme from among the one or more image adaptation schemes, each image adaptation scheme ranked as a function of, at least, its determined objective measure of information fidelity IF with respect to the region R, and the selecting based on the following:

$$\max_I (IF_I) = \max_I \left( \sum_{AO_1 \in I} AV_i \cdot u(r_I^2 \cdot size(ROI_i) - MPS_i) \right)$$

$$= \max_I \left( \sum_{AO_1 \in I} AV_i \right) \forall \text{ valid } I \subset \{AO_1, AO_2, \ldots AO_N\},$$

wherein I is a set of valid attention objects, $IF_I$ is an information fidelity of I, $AV_i$ is an attention value of $AO_i$, $r_I$ is a scaling ratio for an image corresponding to I, $size(ROI_i)$ is a spatial size of a region $ROI_i$ corresponding to $AO_i$, $MPS_i$ is a minimal perceptible size of $AO_i$, and the function u(x) has the value 1 when x is nonnegative and 0 otherwise; and adapt the image via the substantially optimal adaptation scheme to generate an adapted image on an output display as a function of at least the target area T.

46. The system of claim 45, wherein at least one attention of the visual attentions is based on at least one of: a saliency attention model, a face attention model, and a text attention model.

47. The system of claim 45, wherein the resource constraint comprises at least one of spatial region size, color depth, and ratio of compression.

48. The system of claim 45, wherein:

the image is contained in a composite content comprising other images; and modeling the image further comprises determining a context of the image as compared to respective contexts of the other images to assist in determining attention object attributes of the image.

49. The system of claim 45, wherein the one or more program modules are further configured to, at least:

assign a respective attention value to each attention object, the attention value indicating a relative importance of image information represented by the attention object as compared to other ones of the attention objects;

indicate a respective weight for each of the visual attentions; and for each visual attention, adjust assigned attention values of corresponding attention objects based on corresponding weights.

* * * * *